United States Patent [19]

Iiyama et al.

[11] Patent Number: 4,531,491
[45] Date of Patent: Jul. 30, 1985

[54] FUEL INJECTION RATE CONTROL SYSTEM FOR AN INTERNAL COMBUSTION ENGINE

[75] Inventors: Akihiro Iiyama, Yokosuka; Hiroaki Miyazaki, Kamakura; Yukihiro Etoh, Yokohama; Toshiaki Tanaka, Chigasaki, all of Japan

[73] Assignee: Nissan Motor Company, Limited, Yokohama, Japan

[21] Appl. No.: 556,606

[22] Filed: Nov. 30, 1983

[30] Foreign Application Priority Data

Dec. 6, 1982 [JP] Japan ............................ 57-212640
Feb. 14, 1983 [JP] Japan ............................ 58-19004

[51] Int. Cl.³ .......................................... F02D 31/00
[52] U.S. Cl. .................................... 123/357; 123/450; 123/494; 73/119 A; 417/462
[58] Field of Search .............. 123/357, 358, 359, 458, 123/459, 450, 494; 417/462, 221, 252, 253; 73/119 A

[56] References Cited

U.S. PATENT DOCUMENTS

| | | | |
|---|---|---|---|
| 3,412,602 | 11/1968 | Rush et al. | 73/119 A |
| 3,630,643 | 12/1971 | Eheim | 417/282 |
| 3,797,469 | 3/1974 | Kobayashi et al. | 123/357 |
| 4,018,201 | 4/1977 | Williams et al. | 123/359 |
| 4,212,279 | 7/1980 | Ohtani | 123/357 |
| 4,367,714 | 1/1983 | Didomenico et al. | 417/462 |
| 4,397,180 | 8/1983 | Wolff et al. | 73/119 A |
| 4,407,245 | 10/1983 | Ehgim | 123/359 |

FOREIGN PATENT DOCUMENTS

| | | | |
|---|---|---|---|
| 2058947 | 4/1981 | United Kingdom | 123/450 |
| 120085 | 10/1959 | U.S.S.R. | 123/450 |

Primary Examiner—Magdalen Y. C. Moy
Attorney, Agent, or Firm—Schwartz, Jeffery, Schwaab, Mack, Blumenthal & Evans

[57] ABSTRACT

A fuel injection pump serves to periodically inject fuel into an internal combustion engine. A movable control member serves to determine the quantity of fuel injected during each fuel injection stroke in accordance with the position of the control member. A permanent magnet is movable together with the control member. A stationary magnetically-permeable member serves to conduct magnetic flux generated by the permanent magnet. The magnetic flux conducted by the magnetically permeable member depends on the position of the control member. A Hall element unit serves to sense the conducted magnetic flux and generate a first signal indicative of the actual position of the control member. A second signal indicates a desired position of the control member. A device, responsive to the first and second signals, serves to adjust the actual position of the control member to the desired position thereof.

7 Claims, 11 Drawing Figures

FUEL INJECTION RATE CONTROL SYSTEM FOR AN INTERNAL COMBUSTION ENGINE

BACKGROUND OF THE INVENTION

1. Field of the Invention

This invention relates to a fuel injection rate control system for an internal combustion engine, such as a diesel engine.

2. Description of the Prior Art

Diesel engines are supplied with fuel by means of fuel injection pumps, which pressurize fuel periodically with respect to rotation of engine crankshaft to effect fuel injection into the engine combustion chambers. In general, the fuel injection pumps have adjustable fuel metering devices to control the rate of fuel injection which determines the power output of the engines.

U.S. Pat. No. 3,630,643 to Eheim et al. discloses a fuel injection pump equipped with an electrically controlled fuel metering device. This metering device includes a mechanical member or collar, an electrically-powered actuator, and a signal generator. The position of the collar determines the rate of fuel injection. The actuator serves to adjust the position of the collar. The generator outputs a signal representing the position of the collar. Signals indicating the power output required of the engine and the speed of the engine are fed to the metering device, which determines a desired position of the collar, that is, a desired rate of fuel injection, on the basis of these signals. Also, the signal indicative of the collar position is fed to the metering device. On the basis of the desired collar position and the actual collar position derived from the collar position signal, the metering device generates a control signal to adjust the actuator. The control signal is designed such that the actual collar position will match or track the desired collar position. In this way, the metering device uses a feed-back or closed-loop control in adjusting the position of the collar which determines the rate of fuel injection.

SUMMARY OF THE INVENTION

It is an object of this invention to provide a more sophisticated fuel injection rate control system for an internal combustion engine, such as a diesel engine.

In accordance with this invention, a fuel injection rate control system for an internal combustion engine includes a fuel injection pump for periodically injecting fuel into the engine. A movable control member is assoicated with the fuel injection pump for determining the quantity of fuel injected during each fuel injection stroke in accordance with the position of the control member. A permanent magnet is movable together with the control member. A stationary magnetically-permeable member has a portion located near the permanent magnet in order to conduct the magnetic flux generated by the permanent magnet. The magnetic flux conducted by the magnetically permeable member depends on the position of the control member. A Hall element unit is associated with the magnetically permeable member for sensing the conducted magnetic flux and generating a first signal indicative thereof and hence indicative of the actual position of the control member. A first device generates a second signal indicative of a desired position of the control member. A second device, responsive to the first and second signals, serves to adjust the actual position of the control member to the desired position thereof.

The above and other objects, features and advantages of this invention will be apparent from the following description of a preferred embodiment and a modification thereof, taken in conjunction with the drawings.

BRIEF DESCRIPTION OF THE DRAWINGS

FIG. 9 is a diagram of the position sensor and the shaft of the electric motor in which the magnetically permeable member and the shaft of the electric motor are shown end-on.

DESCRIPTION OF THE PREFERRED EMBODIMENT

Figure 1:
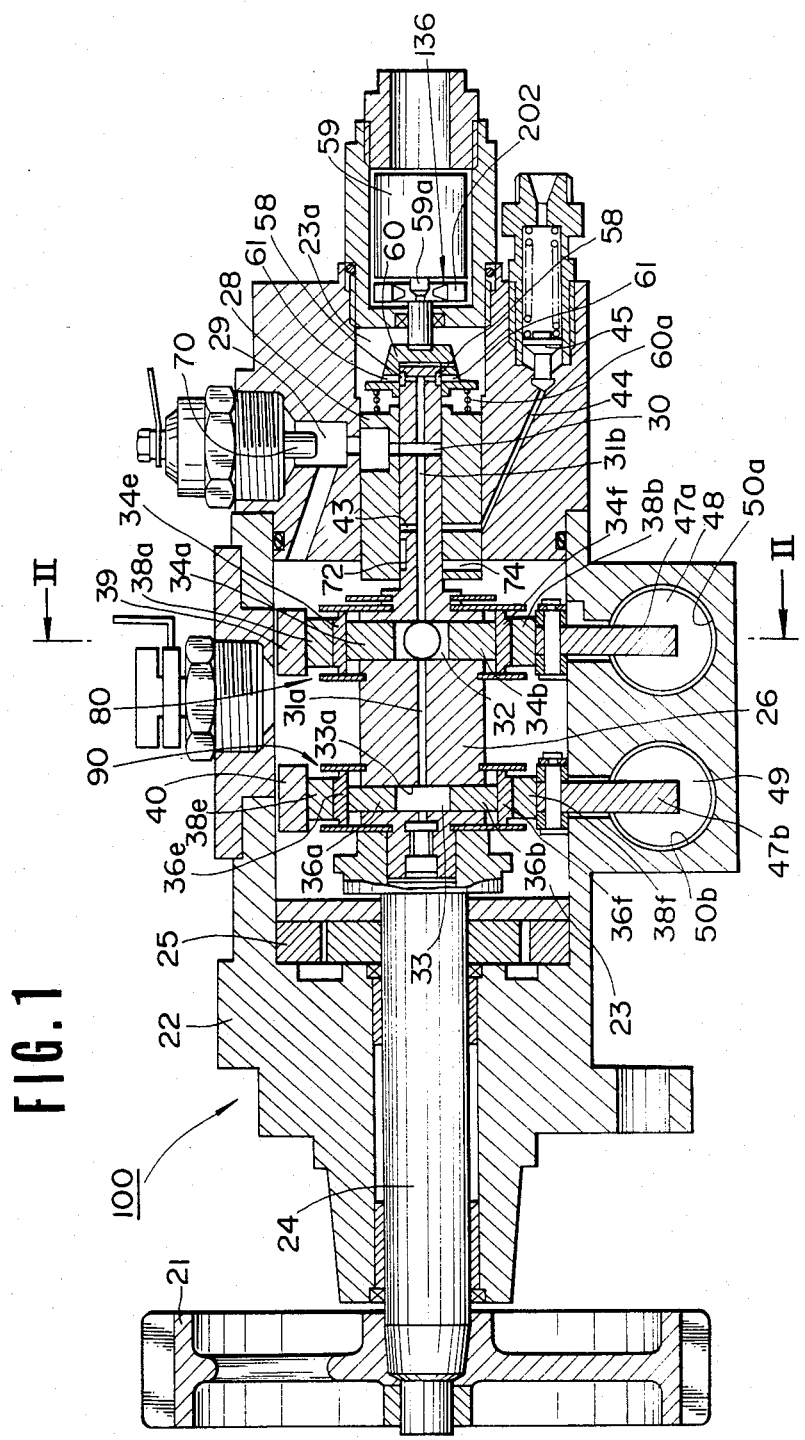
FIG. 1 is a sectional view of a fuel injection pump of this invention taken along a plane including the axis of a rotor.

With reference to FIG. 1, a distribution-type fuel injection pump 100 for a diesel-type internal combustion engine includes a housing 22 and a drive shaft 24 rotatably extending into the housing 22. One end of the drive shaft 24 protruding from the housing 22 is connected to the crankshaft of the engine by a conventional coupling so as to rotate about its axis at half the speed of rotation of the crankshaft. This coupling includes a gear 21 mounted on the drive shaft 24.

The housing 22 defines a fuel inlet (not shown), toward which a feed pump (not shown) drives fuel from a fuel tank (not shown). A vane-type transfer pump 25 located within the housing 22 is mounted on the drive shaft 24 to be driven by the engine. The transfer pump 25 draws fuel via the fuel inlet and then drives fuel into a fuel reservoir or chamber 23 defined within the housing 22.

A cylindrical fuel-distributing rotor 26 disposed within the housing 22 is coaxially connected to the drive shaft 24 to rotate about its axis in conformity with rotation of the drive shaft 24. The rotor 26 rotatably extends through a barrel or sleeve 28 secured to the housing 22.

A fuel intake port 29 formed in the walls of the housing 22 and the sleeve 28 extends from the fuel chamber 23 to the inner surface of the sleeve 28. The rotor 26 has radial fuel intake pasages 30, the number of which equals that of the combustion chambers of the engine. The outer ends of the intake passages 30 opening onto the periphery of the rotor 26 are spaced circumferentially with respect to the rotor 26 at equal angular intervals and are in the same axial position as the inner end of the intake port 29. As the rotor 26 rotates, the intake port 29 relatively moves into and out of register or communication with each of the intake passages 30 sequentially. The rotor 26 is formed with first and second high-pressure or pumping chambers 32 and 33 which commuicate with each other through a first axial passage 31a formed in the rotor 26. A second axial passage 31b formed in the rotor 26 extends from the inner ends of the intake passages 30 to the first pumping chamber 32. When the intake port 29 communicates with the intake passages 30, fuel can be driven out of the reservoir 23 toward the pumping chambers 32 and 33 via the intake port 29, the intake passages 30, and the axial passages 31a and 31b.

The rotor 26 has a radial fuel discharge passage 43, the inner end of which opens into the axial passage 31b and the outer end of which opens onto the periphery of the rotor 26 at a point within the sleeve 28. The walls of the sleeve 28 and the housing 22 define a set of fuel delivery ports 44 extending from the inner surface of the sleeve 28 to the outer surface of the housing 22. The inner ends of the delivery ports 44 are spaced circumferentially with respect to the sleeve 28 at equal angular intervals and are in the same axial position as the discharge passage 43. As the rotor 26 rotates, the discharge passage 43 moves into and out of register or communication with each of the delivery ports 44 sequentially. Thus, fuel can be directed from the pumping chambers 32 and 33 toward each of the delivery ports 44 via the axial passages 31a and 31b, and the discharge passage 43 when the discharge passage 43 comes into communication with each of the delivery ports 44. The number of the delivery ports 44 is equal to that of the combustion chambers of the engine. Each of the delivery ports 44 leads via a check-type delivery valve 45 to a fuel injection valve or nozzle (not shown) designed to inject fuel into the associated combustion chamber of the engine.

Figure 2:
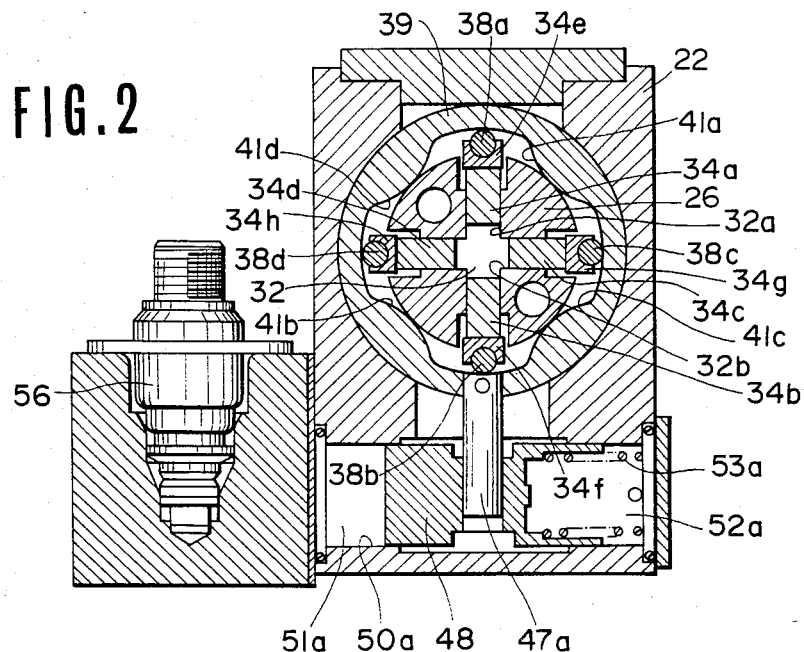
FIG. 2 is a cross-sectional view of the fuel injection pump taken along the line II—II of FIG. 1.

As best shown in FIG. 2, the rotor 26 has a pair of interconnected diametrical bores 32a and 32b, the axes of which are perpendicular to each other. A pair of spaced plungers 34a and 34b are slidably disposed in the first bore 32a. The plungers 34a and 34b extend radially with respect to the rotor 26. Another pair of spaced plungers 34c and 34d are slidably disposed in the second bore 32b. The plungers 34c and 34d extend radially with respect to the rotor 26. The inner ends of the plungers 34a, 34b, 34c, and 34d cooperate to define the first pumping chamber 32 in conjunction with the bores 32a and 32b.

Returning to FIG. 1, the rotor 26 has a diametrical bore 33a, in which a pair of spaced plungers 36a and 36b are slidably disposed. The plungers 36a and 36b extend radially with respect to the rotor 26. The inner ends of the plungers 36a and 36b cooperate to define the second pumping chamber 33 in conjunction with the bore 33a. The displacement or variable volume of the second pumping chamber 33 is chosen to be smaller than that of the first pumping chamber 32. To this end, the diameter of the bore 33a is preferably designed to be smaller than that of the bores 32a and 32b. The bore 33a extends in the same diametrical direction as the bore 32a, so that the plungers 36a and 36b extend in the same radial directions as the plungers 34a and 34b, respectively.

As best shown in FIG. 2, roller shoes or holders 34e, 34f, 34g, and 34h are fixed to the outer ends of the plungers 34a, 34b, 34c, and 34d, respectively. A set of rollers 38a, 38b, 38c, and 38d extending axially with respect to the rotor 26 are rotatably retained by the shoes 34e, 34f, 34g, and 34h, respectively. Part of each of the rollers 38a, 38b, 38c, and 38d exposed by the shoes 34e, 34f, 34g, and 34h engages the inner surface of a frist cam ring 39 concentrically surrounding the rotor 26. The cam ring 39 is disposed within and supported on the housing 22. The inner surface of the cam ring 39 has a set of cam protrusions 41a, 41b, 41c, and 41d, which are spaced circumferentially at equal angular intervals, as are the rollers 38a, 38b, 38c, and 38d. The number of the cam protrusions 41a, 41b, 41c, and 41d equals that of the combustion chambers of the engine. As the rotor 26 rotates, the rollers 38a, 38b, 38c, and 38d rotate about the axis of the rotor 26 and also about their own axes while remaining in contact with the inner surface of the cam ring 39. It should be noted that rotation of the rotor 26 exerts centrifugal forces on the rollers 38a, 38b, 38c, and 38d which help them remain in contact with the cam ring 39. When the rollers 38a, 38b, 38c, and 38d "ascend" the cam protrusions 41a, 41b, 41c, and 41d in accordance with rotation of the rotor 26, the plungers 34a, 34b, 34c, and 34d are displaced radially inward, thereby contracting the pumping chamber 32. When the rollers 38a, 38b, 38c, and 38d "descend" the cam protrusions 41a, 41b, 41c, and 41d in accordance with rotation of the rotor 26, the plungers 34a, 34b, 34c, and 34d are displaced radially outward, thereby expanding the pumping chamber 32.

Returning to FIG. 1, roller shoes or holders 36e and 36f are fixed to the outer ends of the plungers 36a and 36b, respectively. A pair of rollers 38e and 38f extending axially with respect to the rotor 26 are rotatably retained by the shoes 36e and 36f, respectively. Part of each of the rollers 38e and 38f exposed by the shoes 36e and 36f engages the inner surface of a second cam ring 40 concentrically surrounding the rotor 26. The cam ring 40 is disposed within and supported on the housing 22, and is axially spaced from the first ring 39. The inner surface of the cam ring 40 has a set of cam protrusions in the same manner as the inner surface of the first cam ring 39. As the rotor 26 rotates, the rollers 38e and 38f rotate about the axis of the rotor 26 and also about their own axes while remaining in contact with the inner surface of the cam ring 40. When the rollers 38e and 38f "ascend" the cam protrusions on the ring 40 in accordance with rotation of the rotor 26, the plungers 36a and 36b are displaced radially inward, thereby contracting the pumping chamber 33. When the rollers 38e and 38f "descend" the cam protrusions on the ring 40 in accordance with rotation of the rotor 26, the plungers 36a and 36b are displaced radially outward, thereby expanding the working chamber 32.

When the pumping chambers 32 and 33 expand in accordance with rotation of the rotor 26, the intake port 29 generally remains in communication with one of the intake passages 30 so that fuel can be directed from the reservoir 23 toward the pumping chambers 32 and 33 via the intake port 29, the intake passage 30, and the axial passages 31a and 31b. In this way, the fuel intake stroke is performed. When the pumping chambers 32 and 34 contract in accordance with rotation of the rotor 26, the discharge passage 43 generally remains in communication with one of the delivery ports 44 so that fuel can be forced out of the pumping chambers 32 and 33 toward the delivery port 44 via the axial passages 31a and 31b, and the discharge passage 43. Then, the pressurized fuel is directed along the delivery port 44 toward the associated injection valve via the delivery valve 45 before being injected into the associated combustion chamber of the engine via the injection valve. In this way, the fuel injection stroke is performed.

The combination of the plungers 34a, 34b, 34c, and 34d, the first cam ring 39, and the associated elements constitute a first plunger pump 80 including the first pumping chamber 32. The combination of the plungers 36a and 36b, the second cam ring 40, and the associated elements constitute a second plunger pump 90 including the second pumping chamber 33.

An ON-OFF solenoid valve 70 serves to either block or open the intake port 29. When the engine is required to stop, the solenoid valve 70 blocks the intake port 29 to prevent delivery of fuel from the reservoir 23 to the pumping chambers 32 and 33 and hence disable the supply of fuel to the engine. When the engine is required to operate, the solenoid valve 70 opens the intake port 29 to enable the supply of fuel to the engine.

The first cam ring 39 is pivotable relative to the housing 22 in both circumferential directions, that is, in the directions equal to and opposite the direction of rotation of the rotor 26. Pivoting the cam ring 39 in the direction opposite that of rotation of the rotor 26 causes an advance of timing, in regard to rotational angle of the rotor 26 and thus to crank angle of the engine, at which the rollers 38a, 38b, 38c, and 38d encounter the cam protrusions 41a, 41b, 41c, and 41d. Such a pivotal displacement of the cam ring 39, thus, results in an advance of timing of contraction of the pumping chamber 32 which enables fuel injection via the first plunger pump 80. Pivoting the cam ring 39 in the direction of rotation of the rotor 26 causes a retardation of timing, in regard to rotational angle of the rotor 26 and thus to crank angle of the engine, at which the rollers 38a, 38b, 38c, and 38d encounter the cam protrusions 41a, 41b, 41c, and 41d. Such a pivotal displacement of the cam ring 39, thus, results in a retardation of timing of contraction of the pumping chamber 32 which enables fuel injection via the first plunger pump 80. In this way, the angular position of the cam ring 38 relative to the housing 22 determines the timing of contraction of the pumping chamber 32, and thus the timing of fuel injection, in regard to crank angle of the engine, effected by the first plunger pump 80.

The second cam ring 40 is pivotable in a manner similar to that of the first cam ring 39. Pivoting the cam ring 40 in the direction opposite the direction of rotation of the rotor 26 causes an advance of timing, in regard to rotational angle of the rotor 26 and thus to crank angle of the engine, at which the rollers 38e and 38f encounter the cam protrusions on the cam ring 40. Pivoting the cam ring 40 in the direction of rotation of the rotor 26 causes a retardation of timing at which the rollers 38e and 38f encounter the cam protrusions on the cam ring 40. In this way, the angular position of the cam ring 40 relative to the housing 22 determines the timing of contraction of the pumping chamber 33, and thus the timing of fuel injection, in regard to crank angle of the engine, effected by the second plunger pump 90.

As best shown in FIG. 2, a timer piston 48 is slidably disposed in a blind bore 50a defined in the walls of the housing 22 directly below the first cam ring 39. The axis of the bore 50a lies perpendicularly to the axis of the cam ring 39 so that the timer piston 48 can move perpendicularly to the axis of the cam ring 39. One end of the timer piston 48 defines a primary pressure chamber 51a, and the other end of the piston 48 defines a secondary pressure chamber 52a. The primary chamber 51a communicates with the reservoir 23 and thus with the outlet of the transfer pump 25 via a passage (not shown) provided with an orifice or restriction, so that the primary chamber 51a can be supplied with the pressure of fuel at the outlet of the transfer pump 25. The secondary chamber 52a communicates with the inlet of the transfer pump 25 via a passage (not shown), so that the secondary chamber 52a can be supplied with the pressure of fuel at the inlet of the transfer pump 25 which is normally lower than the pressure of fuel at the outlet thereof. A compression spring 53a disposed in the secondary chamber 52a seats between the housing 22 and the timer piston 48 to urge the piston 48 toward the primary chamber 51a. The displacement of the timer piston 48 depends on the difference in pressure between the primary and the secondary chambers 51a and 52a. The timer piston 48 is coupled to the first cam ring 39 via a connecting rod 47a so that the displacement of the timer piston 48 causes angular displacement of the cam ring 39 relative to the housing 22. Therefore, the timing of contraction of the pumping chamber 32 and thus the timing of fuel injection effected by the first plunger pump 80 depend on the difference in pressure between the primary and the secondary chambers 51a and 52a.

The primary chamber 51a and the secondary chamber 52a are interconnected via a passage (not shown) defined in the walls of the housing 22. An ON-OFF electromagnetic or solenoid valve 56 attached to the housing 22 serves to block and open this interconnecting passage. When the solenoid valve 56 is electrically energized and deenergized, the valve 56 opens and blocks this interconnecting passage respectively. As this interconnecting passage is opened and blocked, the difference in pressure between the primary and secondary chambers 51a and 52a drops and rises respectively. If the solenoid valve 56 is electrically driven by a pulse signal with a relatively high frequency, the difference in pressure between the primary and the secondary chambers 51a and 52a is held at a essentially constant level which depends on the duty cycle of the driving pulse signal. As a result, the timing of contraction of the pumping chamber 32 and thus the timing of fuel injection effected by the first plunger pump 80 can be adjusted via control of the duty cycle of the driving pulse signal applied to the solenoid valve 56.

Returning to FIG. 1, a second timer piston 49 is slidably disposed in a blind bore 50b defined in the walls of the housing 22 directly below the second cam ring 40. The axis of the bore 50b lies perpendicularly to the axis of the cam ring 40 so that the timer piston 49 can move perpendicularly to the axis of the cam ring 40. The timer piston 49 is coupled to the second cam ring 40 via a connecting rod 47b so that displacement of the timer piston 49 causes angular displacement of the second cam ring 40. The position of the timer piston 49 is adjustably determined by an arrangement similar to that determining the position of the first timer piston 48. As a result, the timing of contraction of the pumping chamber 33 and thus the timing of fuel injection effected by the second plunger pump 90 can be adjusted in a way similar to that of the first plunger pump 80.

In general, the timing of contraction of the pumping chamber 32 and thus the timing of fuel injection effected by the first plunger pump 80 are controlled in accordance with engine operating conditions, such as the engine load and the engine speed. Also, the timing of contraction of the pumping chamber 33 and thus the timing of fuel injection effected by the second plunger pump 90 are controlled in accordance with the engine operating conditions. Specifically, as the engine speed rises, the timings of contractions of the pumping chambers 32 and 33 advance in terms or units of engine crank angle. As the engine load increases, the timing of contraction of the pumping chamber 32 of the first plunger pump 80 advances relative to the timing of contraction of the pumping chamber 33 of the second plunger pump 90 in terms or units of engine crank angle. These variations in the difference between the timings of contractions of the pumping chambers 32 and 33 cause changes in the characteristic curve of the rate of total fuel injection versus engine crank angle. A system (not shown) for adjusting the timings of contractions of the pumping chambers 32 and 33 via control of the cam rings 39 and 40 in accordance with the engine operating conditions is designed in a manner similar to that disclosed in U.S. patent application, Ser. No. 527,775, filed on Aug. 30, 1983, entitled "Fuel Injection Pump for an Internal Combustion Engine", invented by Toshiaki TANAKA, the portions of which relating to this system is hereby incorporated into the present invention to allow omission of redundant detailed description of this system.

Figure 3:
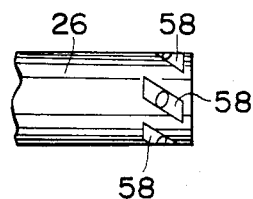
FIG. 3 is a side view of the end of the rotor of the fuel injection pump.
Figure 4:
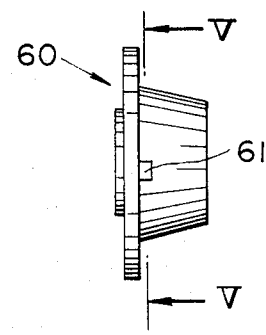
FIG. 4 is a side view of a control cap of the fuel injection pump.
Figure 5:
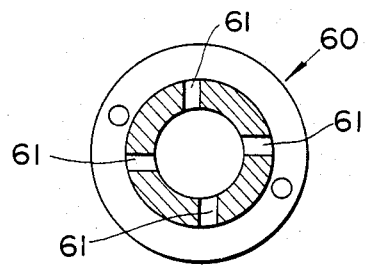
FIG. 5 is a cross-sectional view of the control cap taken along the line V—V of FIG. 4.
Figure 6:
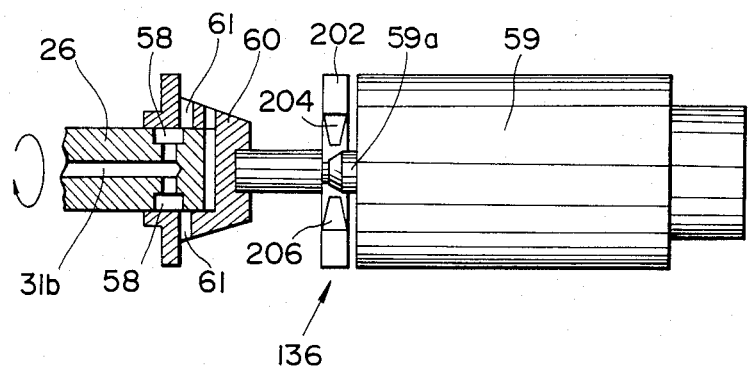
FIG. 6 shows an electric motor and a position sensor in the fuel injection pump in side view, the control cap and the end of the rotor being in longitudinal cross-section.

The outer end of the sleeve 28 and the walls of the housing 22 define a chamber 23a in communication with the reservoir 23 via a suitable passage (not shown). The rotor 26 projects from the sleeve 28 into the chamber 23a. As shown in FIGS. 1, 3, and 6, the periphery of the end of the rotor 26 within the chamber 23a has relief ports or grooves 58 circumferentially spaced at equal intervals. The relief grooves 58 extend obliquely to the axis of the rotor 26. The number of the relief grooves 58 is equal to that of the combustion chambers of the engine. The axial passage 31b leads to the relief grooves 58 via radial passages (not labelled). The end of the rotor 26 and the relief grooves 58 are covered by a control member or cap 60, which is disposed in the chamber 23a and is free to move axially with respect to the rotor 26 while permitting rotation of the rotor 26. As shown in FIGS. 1, 4, 5, and 6, the control cap 60 has relief passages 61 extending therethrough in approximately radial directions with respect to the rotor 26. The inner ends of the relief passages 61 are spaced circumferentially with respect to the rotor 26 at equal angular intervals. The number of the relief passages 61 is equal to that of the relief grooves 58. The control cap 60 is movable only in the axial direction with respect to the rotor 26. The range of axial movement of the relief passages 61 is chosen so as to cover a portion of or the whole of the axial extent of the relief grooves 58. As the rotor 26 rotates, the relief grooves 58 can move into and out of communication with the relief passages 61 sequentially. Since the relief passages 61 open to the chamber 23a, the relief grooves 58 can communicate with the chamber 23a via the relief passages 61. The control cap 60 blocks the relief grooves 58 while the relief passages 61 remain out of communication with the relief grooves 58.

During the fuel injection stroke, i.e., the contraction of the pumping chambers 32 and 33, when the relief grooves 58 come into communication with the relief passages 61, fuel returns from the pumping chambers 32 and 33 to the reservoir 23 via the axial passages 31a and 31b, the relief ports 58, the relief passages 61, and the chamber 23a and consequently fuel flow from the pumping chambers 32 and 33 toward the fuel injection nozzles is interrupted. In this way, communication between the relief grooves 58 and the relief passages 61 interrupts fuel injection. Since the relief grooves 58 are oblique to the axis of the rotor 26, the timing of communication between the relief grooves 58 and the relief passages 61 in terms of crank angle of the engine depends on the axial position of the control cap 60 relative to the rotor 26. As a result, the timing of the end of fuel injection in terms of crank angle of the engine depends on the axial position of the control cap 60 relative to the rotor 26, so that the effective fuel injection stroke and thus the fuel injection quantity during each fuel injection stroke vary as a function of the axial position of the control cap 60 relative to the rotor 26. The effective fuel injection stroke means the duration of fuel injection in terms or units of crank angle of the engine. The fuel injection quantity during each fuel injection stroke means the quantity of fuel injected during each fuel injection stroke.

As shown in FIGS. 1 and 6, a linear electric motor 59 attached to the housing 22 has a linearly movable shaft 59a extending slidably into the chamber 23a. The motor shaft 59a lies in parallel to the axis of the rotor 26. The control cap 60 is securely coupled to the motor shaft 59a, so that the axial position of the control cap 60 relative to the rotor 26 can be controlled via the motor 59. A spring 60a disposed in the chamber 23a seats between the housing 22 and the control cap 60 to urge the control cap 60 relative to the housing 22, preferably, in the axial direction of reducing the fuel injection quantity during each fuel injection stroke.

Figure 7:
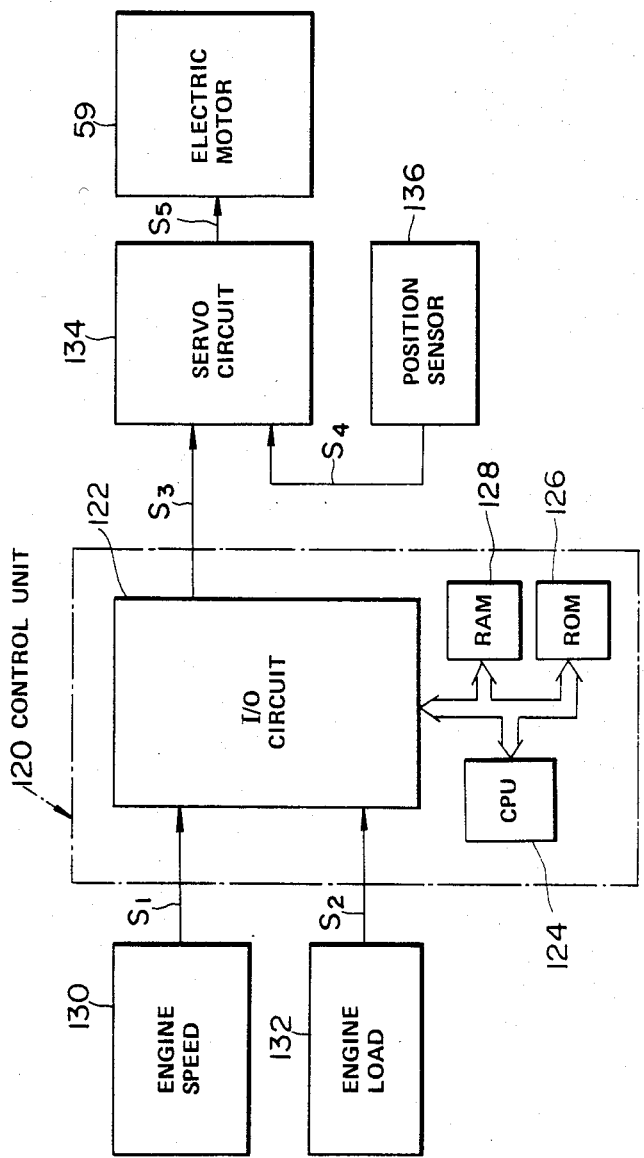
FIG. 7 is a block diagram of circuitry controlling the electric motor.

As shown in FIG. 7, a control unit 120 includes an input/output (I/O) circuit 122, a central processing unit (CPU)124, a read-only memory (ROM)126, a a random-access memory (RAM)128, which are electrically connected to each other and which constitute a microcomputer unit.

A conventional engine speed sensor 130 is associated with the crankshaft or the camshaft of the engine to monitor the rotational speed of the engine and generate a signal $S_1$ indicative thereof. The engine speed sensor 130 is connected to the I/O circuit 122 to supply the engine speed signal $S_1$ to the I/O circuit 122. A well-known engine load sensor 132 is associated with an accelerator pedal or the like whose position determines the power output required of the engine representing the engine load. The engine load sensor 132 detects the engine load and generates a signal $S_2$ indicative thereof. The engine load sensor 132 is also connected to the I/O circuit 122 to supply the engine load signal $S_2$ to the I/O circuit 122.

The control unit 120 generates a control signal $S_3$ designed to adjustably determine the position of the control cap 60 via a servo circuit 134 and the electric motor 59. The control unit 120 adjusts the control signal $S_3$ in response to the signals $S_1$ and $S_2$ in order to control the fuel injection quantity during each fuel injection stroke in accordance with the sensed engine speed and load. Specifically, the control signal $S_3$ indicates the desired position of the control cap 60. A position sensor 136 monitors the actual position of the control cap 60 and generates a signal $S_4$ indicative thereof. The position sensor 136 is connected to the servo circuit 134 to output the position signal $S_4$ to the servo circuit 134. The control unit 120 is also connected to the servo circuit 134 to output the control signal $S_3$ to the servo circuit 134. The control signal $S_3$ has a voltage which varies as a function of the desired position of the control cap 60 determined by the control unit 120 in accordance with the sensed engine speed and load. The position signal $S_4$ has a voltage which varies as a function of the actual position of the control cap 60. The servo circuit 134 includes a difference section which determines the difference in voltage between the signals $S_3$ and $S_4$, that is, the difference between the desired position and the actual position of the control cap 60. The servo circuit 134 generates a drive signal $S_5$ in response to the difference in voltage between the signals $S_3$ and $S_4$. The servo circuit 134 is electrically connected to the electric motor 59 to feed the drive signal $S_5$ to the electric motor 59. The drive signal $S_5$ is designed to adjustably operate the electric motor 59. Specifically, the servo circuit 134 adjusts the drive signal $S_5$ in a known manner such that the actual position of the control cap 60 will follow and equal the desired position thereof. In the case where the electric motor 59 is of the DC driven type, the drive signal $S_5$ has a voltage or a current varying as a function of the difference in voltage between the signals $S_3$ and $S_4$.

The control unit 120 operates in accordance with a program stored in the memory 126. First, the control unit 120 derives the current values of the engine speed and load from the signals $S_1$ and $S_2$. Second, the control unit 120 determines the desired position of the control cap 60 representative of the desired fuel injection quantity during each fuel injection stroke on the basis of these engine speed and load values. This determination of the desired position of the control cap 60 is performed by referring to a table in which a set of values of the desired position of the control cap 60 are plotted as functions of the engine speed and load. Note that this table is stored in the memory 126. Third, the control unit 120 sets the voltage of the control signal $S_3$ to a value corresponding to the desired position of the control cap 60. The control unit 120 cyclically repeats the sequence of these operation steps.

Figure 8:
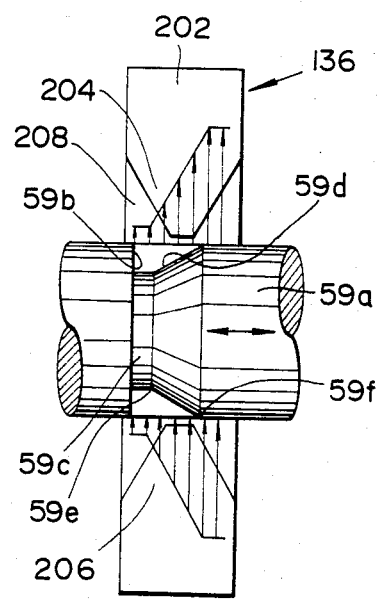
FIG. 8 is a side view of a magnetically permeable member of the position sensor and the shaft of the electric motor.

As best shown in FIG. 8, the motor shaft 59a is circular in cross-section and is formed with an annular step or shoulder 59b, a smaller-diameter portion 59c, and a truncated-cone or tapered portion 59d having an axis parallel to the direction of movement thereof. The smaller-diameter portion 59c has a diameter smaller than that of the rest of the motor shaft 59a, and extends from the step 59b to a predetermined position 59e through a relatively small axial extent. The tapered portion 59d extends from the position 59e to another predetermined position 59f and has a tapered surface so that the diameter of the tapered portion 59d increases at a fixed rate axially from the position 59e to the position 59f. The tapered portion 59d is permanently magnetized, that is, made of a permanent magnet, so that the magnetic field strength at a stationary point radially outside of the tapered portion 59d increases or decreases as the motor shaft 59a moves axially.

As shown in FIGS. 1, 6, 8, and 9, the position sensor 136 includes a magnetically permeable or conductive member 202 located radially outward of the tapered portion 59d of the motor shaft 59a. The member 202 is secured to a stationary body or casing of the motor 59 by a suitable support (not shown) to be fixed with respect to the housing 22. The member 202 is made of ferromagnetic material to conduit magnetic field or flux generated by the permanent magnet. The member 202 has a pair of arms 204 and 206, and a bridge 208 connecting the arms 204 and 206. The arms 204 and 206 lie on radially opposite sides of the motor shaft 59a and extend outward from positions immediately radially outside of the tapered portion 59d or from positions in the periphery thereof. The bridge 208 is arched and extends between the outer ends of the arms 204 and 206 in a semicircle concentric with respect to the motor shaft 59a. The inner ends of the arms 204 and 206 each have a concave edge conforming to the contours of the motor shaft 59a and also taper so as to have dimensions or thicknesses parallel to the axis of the motor shaft 59a which decrease to minimums at their edges opposing the motor shaft 59a. At least parts of these inner edges of the arms 204 and 206 remain within the axial extent of the tapered portion 59d as the motor shaft 59a moves through its axial stroke. Part of magnetic flux generated by the permanent magnet travels from and back to the tapered portion 59d by way of the member 202. Since the magnetic field strength at a stationary point radially outside of the tapered portion 59d increases or decreases as the motor shaft 59a moves axially as described previously, the magnetic field or flux travelling through the member 202 also increases or decreases in accordance with axial displacement of the motor shaft 59a.

Figure 9:
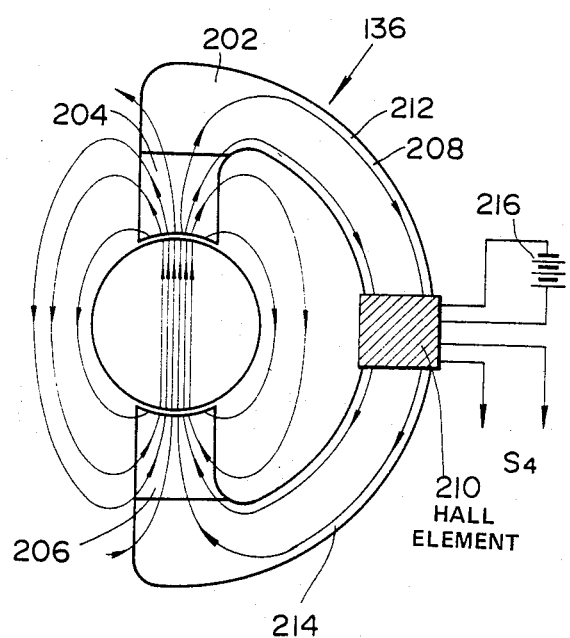

As shown in FIG. 9, the position sensor 136 includes a commercially Hall effect device or Hall element unit 210 interposed in the center of the bridge 208 of the magnetically permeable or conductive member 202 to measure the magnetic field or flux travelling through the member 202. Specifically, the bridge 208 has a pair of halves 212 and 214 which extend from the arms 204 and 206 respectively and which sandwich the Hall element unit 210 therebetween. The Hall element unit 210 has a a pair of DC voltage input terminals or DC power supply terminals connected to a pair of output terminals of a DC voltage source 216 to receive a constant DC voltage from the source 216. The Hall element unit 210 also has a pair of output terminals, the voltage between which varies as a linear function of the intensity of the magnetic field or flux travelling through the member 202. Thus, the voltage between the output terminals of the Hall element unit 210 indicates the axial displacement or axial position of the motor shaft 59a. Since the motor shaft 59a is stationary with respect to the control cap 60 (see FIGS. 1, 4, 5 and 6), the voltage outputted by the Hall element unit 210 indicates the axial position of the control cap 60. This voltage outputted by the Hall element unit 210 constitutes the position signal $S_4$.

Figure 10:
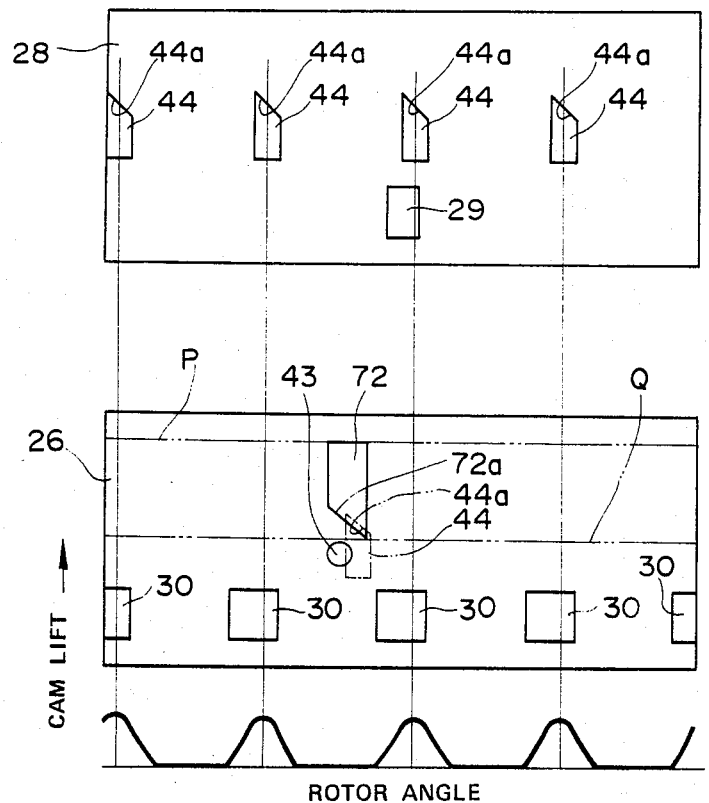
FIG. 10 is a diagram of a sleeve in the fuel injection pump, the rotor, and the relationship between the rotational angle of the rotor and the displacement of plungers in the fuel injection pump in which the inner surface of the sleeve and the outer surface of the rotor are shown in developed view.

As shown in FIGS. 1 and 10, the rotor 26 has an axially-extending auxiliary relief groove 72 within the sleeve 28. The auxiliary relief groove 72 has a section which can overlap the inner ends of the delivery ports 44, so that the auxiliary relief groove 72 moves into and out of communication with each of the delivery ports 44 sequentially as the rotor 26 rotates. In the case where the control cap 60 assumes a position in which the fuel injection quantity during each fuel injection stroke is maximized, immediately after the fuel return from the pumping chambers 32 and 33 to the reservoir 23 via the relief passages 61 of the control cap 60 is established to interrupt the fuel injection, the discharge passage 43 continues to communicate with each of the delivery ports 44 and the auxiliary relief groove 72 moves into communication with each of the delivery ports 44 so that the discharge passage 43 comes into communication with the auxiliary relief groove 72 via each of the delivery ports 44. In other words, the communication between the discharge passage 43 and the auxiliary relief groove 72 starts when rotation of the rotor 26 progresses slightly from a situation at which the fuel return via the relief passages 61 of the control cap 60 in the fuel injection quantity maximizing position occurs. The sleeve 28 has radially-extending auxiliary relief ports 74, the number of which equals that of the engine combustion chambers. The inner ends of the auxiliary relief ports 74 opening onto the inner surface of the sleeve 28 are spaced circumferentially with respect to the rotor 26 at equal angular intervals. The outer ends of the auxiliary relief ports 74 open into the reservoir 23. The inner ends of the auxiliary relief ports 74 are in the same axial position as a section of the auxiliary relief groove 72, so that the auxiliary relief groove 72 moves into and out of communication with each of the auxiliary relief ports 74 sequentially as the rotor 26 rotates. The inner ends of the auxiliary relief ports 74 are in substantially the same angular position as the inner ends of the delivery ports 44. While the discharge passage 43 remains in communication with the auxiliary relief groove 72 via each of the delivery ports 44, the auxiliary relief groove 72 continues to communicate with each of the auxiliary relief ports 74. Therefore, immediately after the fuel return from the pumping chambers 32 and 33 to the reservoir 23 via the relief passsages 61 of the control cap 60 is established to interrupt the fuel injection, the discharge passage 43 comes into communication with the reservoir 23 via each of the delivery ports 44, the auxiliary relief groove 72, and each of the auxiliary relief ports 74 so that the pressure of fuel in the pumping chambers 32 and 33, the axial passages 31a and 31b, and each of the delivery ports 44 is quickly relieved or reduced to a level essentially equal to the pressure of fuel in the reservoir 23. As a result, each fuel injection stroke is quickly and completely terminated without unwanted fuel injection after the fuel return from the pumping chambers 32 and 33 to the reservoir 23 via the relief passages 61 of the control cap 60 is established. This quick and complete termination of each fuel injection stroke allows accurate control of the fuel injection quantity during each fuel injection stroke.

As shown in FIG. 10, the auxiliary relief groove 72 has an edge 72a which can communicate with each of the delivery ports 44 and which extends obliquely with respect to the axis of the rotor 26. Each of the delivery ports 44 has an edge 44a which can communicate with the auxiliary relief groove 72 and which extends essentially parallel to the edge 72a of the auxiliary relief groove 72.

As a reference, FIG. 10 also illustrates the relationship between the rotational angle of the rotor 26 and the cam lift which corresponds to the displacement of the plungers 34a, 34b, 34c, and 34d, or that of the plungers 36a and 36b.

Figure 11:
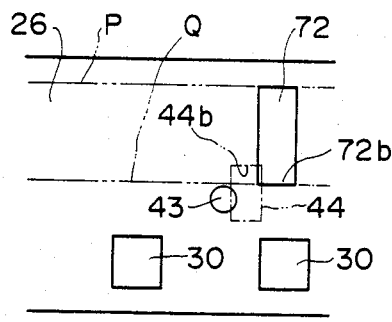
FIG. 11 is a diagram of a modified rotor and a modified sleeve.

As shown in FIG. 11, the auxiliary relief groove 72 may have an edge 72b in place of the oblique edge 72a (see FIG. 10), the edge 72b extending perpendicularly to the axis of the rotor 26. In this case, each of the delivery ports 44 should have an edge 44b in place of the oblique edge 44a, the edge 44b extending essentially parallel to the edge 72b.

In FIGS. 10 and 11, the broken lines P and Q indicate traces of movements of the opposing edges of the relief groove 72.

The electric motor 59 may have a rotatable shaft. In this case, it is necessary to provide a motion converting mechanism, such as a rack and pinion, for converting rotation of the motor shaft into linear motion transmitted to the control cap 60. Furthermore, part of the motor shaft near which the magnetically permeable or conductive member 202 is fixedly located needs to be permanently magnetized. The permanent magnet must have a configuration such that magnetic field or flux conducted to the Hall element unit 210 via the member 202 varies with rotation of the motor shaft.

What is claimed is:

1. A fuel injection rate control system for an internal combustion engine, comprising:
   (a) a fuel injection pump for periodically injecting fuel into the engine;
   (b) a movable control member associated with the fuel injection pump for determining the quantity of fuel injected during each fuel injection stroke in accordance with the position of the control member;
   (c) a truncated-cone-shaped permanent magnet movable together with the control member and having an axis parallel to the direction of movement of said permanent magnet;
   (d) a stationary magnetically-permeable member having a portion lying radially outward of the permanent magnet for conducting magnetic flux generated by the permanent magnet, the magnetic flux conducted by the magnetically permeable member depending on the position of the control member;
   (e) a Hall element unit associated with the magnetically permeable member for sensing the magnetic flux conducted by the magnetically permeable member and for generating a first signal indicative thereof and hence indicative of the actual position of the control member;
   (f) menas for generating a second signal indicative of a desired position of the control member; and
   (g) means, responsive to the first and second signals, for adjusting the actual position of the control member to the desired position thereof.

2. A fuel injection rate control system for an internal combustion engine having a rotatable crankshaft and a combustion chamber, comprising:
   (a) a reservoir chamber supplied with fuel;
   (b) a rotor coupled to the crankshaft for rotation about the axis of the rotor in accordance with rotation of the crankshaft;
   (c) a pumping chamber at least partially defined by the rotor;
   (d) means for expanding and contracting the pumping chamber in accordance with rotation of the rotor;
   (e) means for directing fuel from the reservoir chamber toward the pumping chamber as the pumping chamber expands;
   (f) means for directing fuel from the pumping chamber toward the combustion chamber to effect fuel injection as the pumping chamber contracts;
   (g) a main relief passage extending from the pumping chamber to the reservoir chamber via a surface of the rotor;
   (h) a movable control member associated with the surface of the rotor for selectively blocking and opening the main relief passage to enable and disable the fuel injection in accordance with rotation of the rotor, the control member being operative to maintain the time of opening of the main relief passage at a moment within a period of contraction of the pumping chamber and also being operative to determine the quantity of fuel injected during each fuel injection stroke in accordance with the position of the control member;

(i) a auxiliary relief passage extending from the pumping chamber to the reservoir chamber;

(j) auxiliary relieving means for selectively blocking and opening the auxiliary relief passage in accordance with rotation of the rotor, the opening of the auxiliary relief passage occurring when rotation of the rotor progresses slightly from a situation at which the opening of the main relief passage occurs in the case of the control member being in a position where the fuel injection quantity during each fuel injection stroke is maximized;

(k) a permanent magnet movable together with the control member;

(l) a stationary magnetically-permeable member having a portion located near the permanent magnet for conducting magnetic flux generated by the permanent magnet, the magnetic flux conducted by the magnetically permeable member depending on the position of the control member;

(m) a Hall element unit associated with the magnetically permeable member for sensing the magnetic flux conducted by the magnetically permeable member and for generating a first signal indicative thereof and hence indicative of the actual position of the control member;

(n) means for generating a second signal indicative of a desired position of the control member; and (o) means, responsive to the first and second signals, for adjusting the actual position of the control member to the desired position thereof.

3. A fuel injection rate control system as recited in claim 2, wherein:

(a) the auxiliary relieving means includes a stationary sleeve surrounding the rotor; and (b) the auxiliary relief passage includes first, second, third, and fourth positions, the first portion defined in the rotor, the first portion extending from the pumping chamber and opening onto the rotor, the second portion defined in the sleeve for selective communication with the first portion, the third portion defined in the rotor for selective communication with the first portion via the second portion, the fourth portion defined in the sleeve for selective communication with the first portion via the second and third portions and leading to the reservoir chamber.

4. A fuel injection rate control system as recited in claim 2, wherein the direction of movement of the control member is axial with respect to the rotor.

5. A fuel injection system for an internal combustion engine, comprising:

(a) a fuel injection pump for periodically injecting fuel into the engine;

(b) a movable control member associated with the fuel injection pump for determining the rate of the fuel injection in accordance with the position of the control member;

(c) a permanent magnet movable together with the control member and having a tapered portion whose axis extends parallel to the direction of movement of the tapered portion; and (d) a Hall element arrangement for sensing magnetic flux reflecting the strength of magnetic field at a fixed point radially outward of the tapered portion and thereby generating a signal indicative of the actual position of the control member.

6. A fuel injection system as recited in claim 5, wherein the Hall element arrangement comprises:

(a) a stationary magnetically-permeable member having a portion lying radially outward of the tapered portion of the permanent magnet for conducting the magnetic flux; and (b) a Hall element unit associated with the magnetically permeable member for sensing the magnetic flux and for generating the signal indicative of the actual position of the control member.

7. A fuel injection system as recited in claim 5, further comprising:

(a) means for generating a signal indicative of a desired position of the control member; and (b) means, responsive to the actual position signal and the desired position signal, for adjusting the actual position of the control member to the desired position thereof.

* * * * *